United States Patent [19]

Wada

[11] Patent Number: 4,645,597
[45] Date of Patent: Feb. 24, 1987

[54] FILTER MEDIUM AND METHOD OF MANUFACTURING THE SAME

[75] Inventor: Yoneji Wada, Tokyo, Japan

[73] Assignee: Origin Company Limited, Gifu, Japan

[21] Appl. No.: 739,370

[22] Filed: May 30, 1985

[30] Foreign Application Priority Data

Jun. 7, 1984 [JP] Japan .................................. 59-117293
Jun. 12, 1984 [JP] Japan .................................. 59-120138
Nov. 12, 1984 [JP] Japan .................................. 59-237754

[51] Int. Cl.$^4$ ........................ B01D 35/06; B01D 39/14
[52] U.S. Cl. .................................... 210/222; 210/496; 210/502.1; 55/515; 428/244; 428/242
[58] Field of Search ................... 210/502.1, 222, 223, 210/484, 487, 496, 503, 679; 55/387, 515, 527; 428/240–244, 369, 370

[56] References Cited

U.S. PATENT DOCUMENTS

| | | | |
|---|---|---|---|
| 2,568,144 | 9/1951 | Cremer et al. | 210/502.1 X |
| 3,664,095 | 5/1972 | Asker et al. | 210/502.1 X |
| 4,016,080 | 4/1977 | Williams | 210/502.1 X |
| 4,201,827 | 5/1980 | Heitkamp | 210/496 X |
| 4,313,832 | 2/1982 | Shimizu et al. | 210/502.1 X |
| 4,395,332 | 7/1983 | Klein | 210/502.1 X |
| 4,604,205 | 8/1986 | Ayers | 210/502.1 X |
| 4,608,173 | 8/1986 | Watanabe et al. | 210/502.1 |

*Primary Examiner*—Tom Wyse
*Attorney, Agent, or Firm*—James W. Hellwege

[57] ABSTRACT

A filtering member made of a filtering paper or nonwoven fabric tape is folded into a V-shaped cross sectional configuration, absorbing agents are uniformly dropped into the folded filtering member, the filtering member is further folded to wrap the absorbing agents therein and finally the filtering member is twisted to form a filter medium in the form of a string. The absorbing agents may be active carbon, active kaoline, water absorbing resin, magnetized magnetic material or combinations thereof.

11 Claims, 9 Drawing Figures

FILTER MEDIUM AND METHOD OF MANUFACTURING THE SAME

BACKGROUND OF THE INVENTION

The present invention relates to a filter medium for filtering impurities out of fluids and a method of manufacturing the filter medium.

A filter medium for filtering impurities having relatively large diameters is generally formed by a kind of sieve. However, in a fluid there are contained not only solid grains having large diameters, but also particles having very small diameters and fluids of different kinds. For instance, in an engine oil for use in motor cars there are included various kinds of particles having different sizes such as iron powders, carbon particles, pigments and liquids such as water. Particularly, fine particles and liquids could not be easily removed by the conventional filter medium. Therefore, absorbing agents such as active carbon and activated white clay(kaoline) are provided in the filter medium.

Heretofore, there has been proposed a charcoal filter in which absorbing agents are mixed in a filtering member or inserted between sheet-like filtering members such as filtering paper and nonwoven fabric. In these known filter medium, it is quite difficult to perform the desired filtering action due to the fact that the absorbing agents might move in the filtering members or flow out of the filtering members.

It has been further known that the hot active carbon particles are spread on an nonwoven fabric made of polypropylene resin and are fused onto the fabric. However, in such a filter medium, the absorbing agents, i.e. carbon particles are not firmly secured to the filtering member i.e. polypropylene unwover fabric and further the filterability of the fabric is largely lost at positions where the carbon particles are fused, so that the filtering efficiency is decreased. It has been also known to secure the absorbing agents to the filtering member by means of a bonding agent. In such a known filter medium, the filtering efficiency is also decreased. Further, the bonding agent might affect the absorbing function of the absorbing agents.

In an oil cleaner, fine magnetic particals such as iron particles produced by the friction of machine parts should be removed. Such magnetic particles may be absorbed by means of a filter medium including permanent magnet particles. However, it is almost impossible to spread uniformly the magnet particles or powder on the filtering member, because the magnet particles are attracted to each other.

Further, in case of filtering impurities out of an oil, it is necessary to remove water contained in the oil. However, in the known filter medium since the filtering member is clogged due to the water absorption by means of OH-radical, the filterability is decreased to a large extent.

SUMMARY OF THE INVENTION

The present invention has for its object to provide a novel and useful filter medium in which absorbing agents can be uniformly and firmly embedded in filtering member and the filtering function can be performed efficiency.

According to the invention, a filter medium comprises a filtering member made of tape-like porous material; and absorbing agents uniformly embedded in the filtering member; whereby the filtering member having the absorbing agents embedded therein being twisted to form a string.

The present invention also relates to a method of manufacturing a filter medium in a simple and effective manner.

According to the invention, a method of manufacturing a filter medium including absorbing agents embedded or wrapped in a filtering fabric comprises the steps of:

feeding continuously a tape of a filtering member made of porous material;

folding the tape to form a continuous recess therein;

dropping absorbing agents uniformly into the recess of the tape;

wrapping continuously the absorbing agents by the filtering member; and twisting the filtering member to form a filter medium in the form of a string.

DESCRIPTION OF THE PREFERRED EMBODIMENTS

Figure 2:
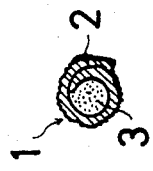
FIG. 2 is a cross sectional view illustrating the filter medium shown in FIG. 1.
Figure 1:
FIG. 1 is a side view showing an embodiment of the filter medium according to the invention.

FIG. 1 is a side view of an embodiment of the filter medium according to the invention and FIG. 2 is a cross sectional view thereof. The filter medium 1 of the present embodiment comprises a filtering member 2 made of filtering paper or nonwoven fabric having air permeability and water permeability and absorbing agents 3 made of active carbon. The grain like absorbing agents 3 are embedded in the filtering member 2 and the filtering member is twisted in the form of a string or rope.

Figure 3:
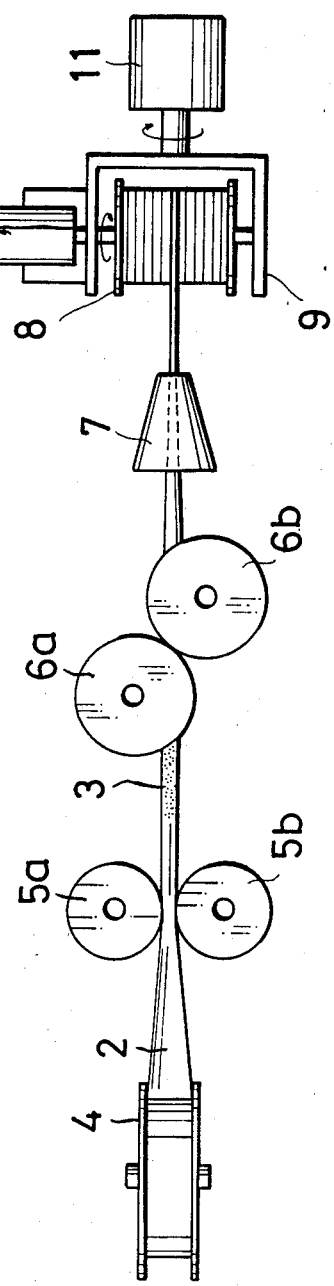
FIG. 3 is a schematic view depicting an embodiment of an apparatus for performing the method according to the invention.
Figure 6:
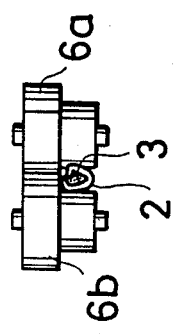
FIGS. 4, 5, 6 and 7 are cross sectional views showing configurations of the filtering member at various manufacturing steps.
Figure 5:
Figure 4:
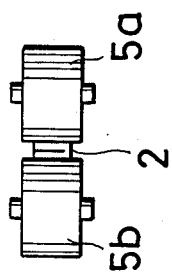
Figure 7:

FIG. 3 shows an apparatus for carrying out the manufacturing method according to the invention. The tape-like filtering member 2 having a width of 50 mm has been wound on a bobbin 4. The filtering member 2 is unwound from the bobbin 4 by rotating the bobbin and is passed through a first pair of folding rolls 5a and 5b. Then the filtering member 2 is folded by the rolls 5a and 5b as illustrated in FIG. 4. After the filtering member 2 has passed through the rolls 5a and 5b, the filtering member 2 is deformed into V-shape cross sectional configuration as shown in FIG. 5 due to the resilience of the filtering member. Then, active carbon grains serving as the absorbing agent 3 are continuously dropped into a recess of the folded filtering member 2 from a measuring hopper not shown. Next the filtering member 2 is introduced into a second pair of folding rolls 6a and 6b. The folding rolls function to fold uper edges of the V-shaped filtering member 2 inwardly so as to enclose or wrap the absorbing agents 3. The rolls 6a and 6b are arranged along the travelling path of the filtering member 2. As illustrated in FIG. 6, while the filtering member 2 is passed through the folding rolls 6a and 6b, the upper edges of the member are folded inwardly so as to wrap the absorbing agents 3 therein. Then the filtering member 2 having the absorbing agents 3 embedded therein is passed through a tapered cone 7 so that the filtering member 2 is pressed to decrease its diameter to 3 mm as depicted in FIG. 7. Finally the filtering member 2 is wound on a take-up drum 8 which is supported by a frame 9 and is rotated by a motor 10. The frame 9 is rotated by a twisting motor 11. Then the filtering member 2 is twisted and wound on the drum 8. In this manner the filter medium 1 in the form of a string or rope can be obtained, while the filtering agents 3 are uniformly and firmly embedded in the twisted filtering member 2.

When the filter medium 1 according to the invention is used, solid particles in a fluid are removed by the filtering member 2 and at the same time odor elements contained in the fluid are effectively absorbed by the active carbon 3. In order to remove pigment contained in the fluid, the absorbing agent 3 is preferably made of activated white clay (active kaoline). Further a mixture of active carbon and active kaoline may be advantageously used as the absorbing agent 3. Then, odor and pigment as well as large particles contained in the fluid can be effectively filtered out.

In another embodiment of the filter medium according to the invention, the absorbing agent is made of water absorbing resin such as polyacrylic acid soda polymer and is embedded in the filtering member made of filtering paper or filtering nonwoven fabric. By using such a filter medium it is possible to remove water in an oil effectively. When the filter medium is made only of the filtering member, the filtering member absorbs the water and is dumped, so that its function as the sieve becomes deteriorated. On the other hand, when use is made only of the water absorbing resin, the water is hardly absorbed, because in the oil, water is covered with the oil to form emulsion, so that the water is prevented from being directly brought into contact with the water absorbing agent. Contrary to this, according to the invention, the emulsion is broken when the liquid is passed through the filtering member and water is absorbed by OH-radicals of the fabric forming the filtering member. Then the water is further absorbed by the water absorbing agents embedded in the filtering member, and therefore the filtering member is activated again. In this manner the water component contained in the oil can be effectively absorbed by the water absorbing agents. It should be noted that if the filtering member does not possess the water absorbing property, the water is directly absorbed by the water absorbing agents.

Figure 8:
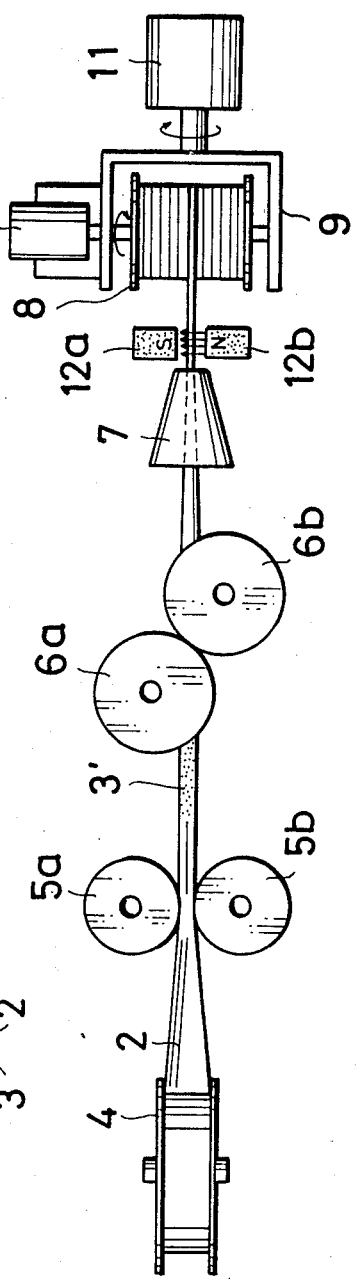
FIG. 8 is a schematic view depicting another embodiment of the filter medium manufacturing apparatus.

FIG. 8 is a schematic view showing another embodiment of the apparatus for manufacturing the filter medium according to the invention. In the present embodiment portions similar to those shown in FIG. 3 are denoted by the same reference numerals used in FIG. 3. In the present embodiment, the absorbing agents are formed by magnetic particles 3' such as alnico and ferrite powders. After the filtering member 2 is folded by the first pair of folding rolls 5a and 5b, the magnetic particles 3' are dropped into a groove of the folded filtering member 2. Then, the magnetic powders 3' are embedded or wrapped by the filtering member by means of the second pair of folding rolls 6a and 6b. After the filtering member 2 has passed through the tapered cone 7, the filter member is passed through a pair of permanent magnets 12a and 12b to magnetize the magnetic powders 3'. Then the filtering member 2 is twisted and wound on the take-up drum 9 to form the filter medium having the magnetized magnetic particles 3' embedded therein. According to the invention, since the non-magnetized magnetic powders are first uniformly embedded in the filtering member and then the magnetic particles are magnetized, it is possible to obtain the filter medium in which the magnetized magnetic particles are uniformly held in the filtering member.

When the above mentioned filter medium is used for filtering the oil, it is possible to remove magnetic particles such as iron powders contained in the oil effectively.

Figure 9:
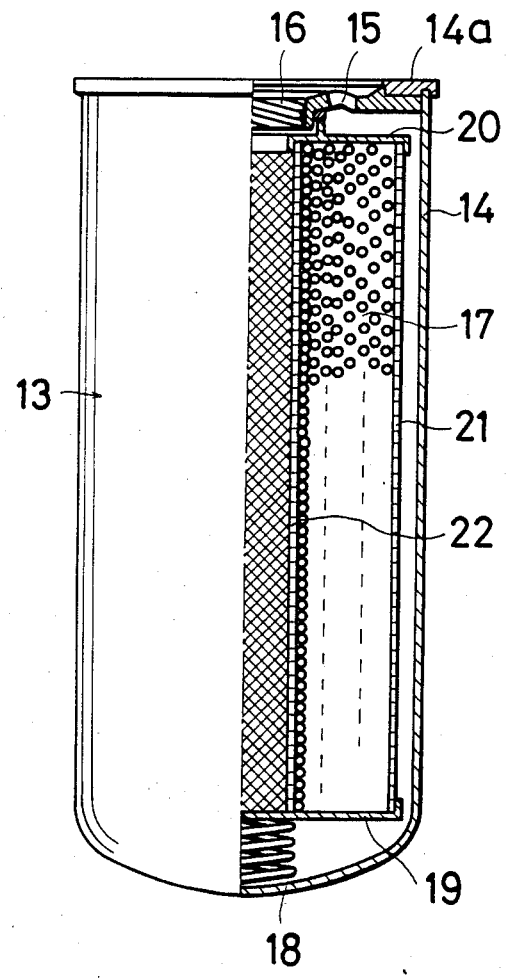
FIG. 9 is a cross sectional view illustrating an oil cleaner comprising the filter medium according to the invention.

FIG. 9 shows an oil cleaner 13 comprising the filter medium according to the invention. The oil cleaner 13 comprises an outer housing 14 and a cap 14a having an oil inlet 15 and an oil outlet 16 formed therein. In the housing 14 is supported a filter body 17 by means of a coiled spring 18. The filter body 17 is supported by lower and upper discs 19 and 20 and outer and inner cylinders 21 and 22. The outer and inner cylinders 21 and 22 are formed by a metal mesh or a perforated metal sheet such as a punching metal. The filter body 17 is formed by winding the filter medium according to the invention around the inner cylinder 22 in such a manner that the filter medium is initially packed densely, while in an outer region the filter medium is wound roughly. Then larger impurities in the oil are removed in the outer region and smaller particles are collected in the inner region. In this manner the oil cleaner 13 can work effectively for a long time.

The present invention is not limited to the embodiments explained above, but many modifications may be conceived by those skilled in the art within the scope of the invention. For instance, the filter medium according to the invention may be woven or knitted to form a sheet-like filtering member. Further, in the embodiments illustrated in FIGS. 3 and 8, the filtering member is twisted upon being taken-up around the drum. Then the lenght of the completed filter medium is substantially equal to that of the raw filtering member. However, the filtering member may be twisted when the absorbing agents are embedded in the filtering member. In such a case, the lenght of the finished filter medium becomes shorter than that of the original filtering member. Further, in the embodiment illustrated in FIG. 8, a pair of permanent magnets 12a and 12b may be arranged between the second pair of folding rolls 6a and 6b and the tapered cone 7. Further the magnetization may be carried out after twisting the filtering member.

What is claimed is:

1. A filtering medium comprised of an elongated porous material folded along its longitudinal axis to define a recess within which are present particulate absorbing agents with said elongated porous material being twisted about its longitudinal axis to enclose said particulate absorbing agents within said recess.

2. The filtering medium of claim 1 wherein said porous material comprises filtering paper.

3. The filtering medium of claim 1 wherein said porous material comprises a nonwoven fabric.

4. The filtering medium of claim 1 wherein said particulate absorbing agents are selected from the group consisting of activated carbon, activated kaolin, water absorbing resins, magnetized magnetic particles and mixtures thereof.

5. A method for the production of a filtering medium having particulate absorbing agents present therein comprising the steps of
   (a) providing an elongated porous material folded along its longitudinal axis to define a longitudinal recess;
   (b) placing particulate absorbing agents within said recess; and
   (c) twisting said elongated porous material about its longitudinal axis to enclose said particulate material within said recess and to provide said filtering medium.

6. The method of claim 5 wherein said recess is provided by passing said porous material through a pair of folding rollers.

7. The method of claim 5 wherein said material having said particulate absorbing agent placed therein is compressed prior to being twisted in step (c).

8. The method of claim 5 wherein said porous material comprises filtering paper.

9. The method of claim 5 wherein said porous material comprises a nonwoven fabric.

10. The method of claim 5 wherein said particulate absorbing agents are selected from the group consisting of activated carbon, activated kaolin, water absorbing resins, magnetic particles and mixtures thereof.

11. The method of claim 5 wherein non-magnetic magnetizable particles are placed within said recess, with said particles being magnetized subsequent to formation of said filtering medium.

* * * * *